(12) United States Patent
Chominski

(10) Patent No.: US 7,417,515 B2
(45) Date of Patent: Aug. 26, 2008

(54) ON-CHIP TX/RX ANTENNA SWITCHING

(75) Inventor: Paul Chominski, San Diego, CA (US)

(73) Assignee: Jaalaa, Inc., San Diego, CA (US)

( * ) Notice: Subject to any disclaimer, the term of this patent is extended or adjusted under 35 U.S.C. 154(b) by 0 days.

(21) Appl. No.: 11/434,400

(22) Filed: May 15, 2006

(65) Prior Publication Data

US 2007/0262829 A1    Nov. 15, 2007

(51) Int. Cl.
  *H01P 1/10* (2006.01)
(52) U.S. Cl. .................. 333/105; 333/101; 333/104
(58) Field of Classification Search .......... 333/101, 333/103, 104, 105, 25, 106
  See application file for complete search history.

(56) References Cited

U.S. PATENT DOCUMENTS

| | | | |
|---|---|---|---|
| 6,009,314 A | 12/1999 | Björk et al. | |
| 6,798,314 B2 * | 9/2004 | Nation | 333/104 |
| 6,950,634 B2 | 9/2005 | Dykstra et al. | |
| 6,982,609 B1 * | 1/2006 | McKay et al. | 333/25 |
| 7,057,472 B2 * | 6/2006 | Fukamachi et al. | 333/101 |
| 7,092,681 B2 * | 8/2006 | Rofougaran et al. | 455/103 |

* cited by examiner

*Primary Examiner*—Dean O Takaoka
(74) *Attorney, Agent, or Firm*—Saile Ackerman LLC; Stephen B. Ackerman

(57) ABSTRACT

An on-chip antenna switching scheme for Gigahertz frequencies where for the transmission path a first on-chip switching means is coupled between an on-chip power amplifier and an antenna. In the receiving path a second on-chip switching means at an input to an on-chip low noise amplifier (LNA) connects to ground. Coupled off-chip between the first switching means and antenna and antenna and the second switching means are impedance matching means and a half and a quarter wavelength line, respectively. In transmission mode both switching means are closed, in receiving mode both switching means are open. This allows for optimal transmission of the signal in either direction.

12 Claims, 3 Drawing Sheets

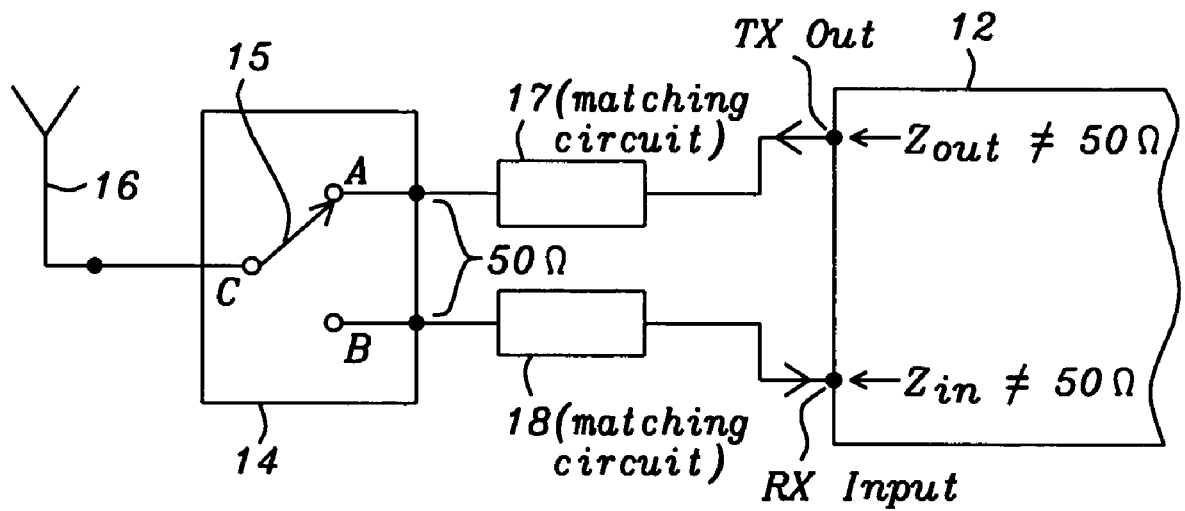
FIG. 1 — Prior Art
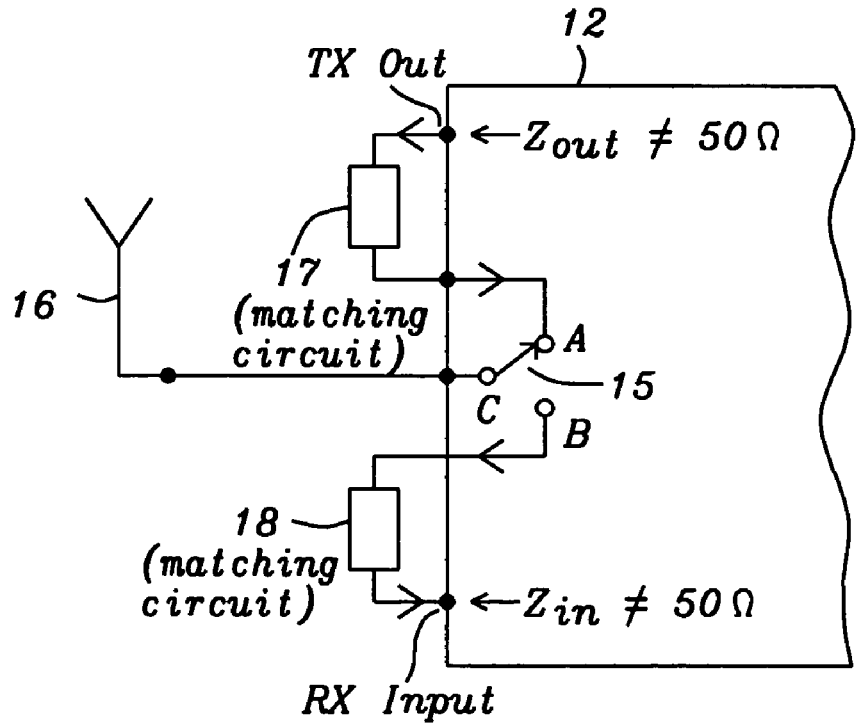
FIG. 2 — Prior Art

ON-CHIP TX/RX ANTENNA SWITCHING

BACKGROUND OF THE INVENTION

1. Field of the Invention

The invention relates to an antenna switching circuit, where the switching is done on-chip, and more particularly to methods of matching the impedance of the chip to the impedance of the antenna in both transmit and receive mode.

2. Description of the Related Art

FIG. 1 illustrates a related art switching scheme where an antenna receives a signal from terminal TX Out and sends a signal to terminal RX Input by controlling a switch. TX Out on chip 12 is coupled via matching circuit 17 to the terminal A of switch 15 in switch unit 14. Center terminal C (also the antenna port) of switch 15 is coupled to antenna 16. When in receiving mode, switch 15 is connected to terminal B and is coupled via matching circuit 18 to terminal RX Input. Since the impedance of TX Out and RX Input is not equal to 50 Ohms, matching circuits 17 and 18 provide matching to the 50 Ohms impedance of switch unit 14. Both TX Out and RX Input are terminals on integrated circuit (IC) chip 12. Switch unit 14, matching circuits 17 and 18 are off-chip. FIG. 2 illustrates a variation of FIG. 1 in that switch 15 is integrated on the IC chip. Terminal TX Out feeds matching circuit 17 which couples back to the IC chip 12 and connects to terminal A of switch 15. Center terminal C of switch 15 connects to antenna 16 as in FIG. 1. In receiving mode, switch 15 connects to terminal B and then couples to off-chip matching circuit 18 which couples back to on-chip terminal RX Input. Typically there is no good impedance match of the on-chip circuits. Part of the impedance mismatch is due to the package parasitics. Nor is the antenna port C impedance Zo equal to 50 Ohms.

U.S. Patents or U.S. Patent Application Publications which relate to the present invention are: U.S. Pat. No. 6,009,314 (Björk et al.) discloses an antenna switch for selectively connecting an output differential signal pair of an output power amplifier to a single-ended signal of an antenna when transmitting and selectively connecting an input differential signal pair of a low noise amplifier to the single-ended signal of the antenna when receiving. A first diode selectively shorts the first differential signal to the second differential signal when the transceiver is receiving, resulting in an open circuit. Likewise a second diode selectively shorts the first differential signal to the second differential signal when the transceiver is transmitting, resulting in an open circuit. U.S. Pat. No. 6,950, 634 (Dykstra et al.) shows a doubly balanced transceiver having a transmit terminal (TX), a receiver terminal (RX) and an antenna terminal, 180° and 90° hybrids, a power amplifier, and a RX/TX switch for disabling the power amplifier so that signals received at the transmitter are reflected to the receive terminal (RX). The doubly balanced architecture also eliminates common-mode noise and reflection problems with the PA gain stages.

It should be noted that the above-cited examples of the related art have the disadvantages that a) the extra IC containing the switch occupies additional area on the printed circuit board (PCB), and b) the switch requires extra control signals from the transceiver or controller IC—this increases the number of pins and size of the package. All this increases production cost. The extra components increase the number of failures, and decrease production yield and the mean time between failures (MTBF). This contrasts with the advantages of the present invention of lower number of external parts, reduction of the overall package and PCB size, and lower cost.

SUMMARY OF THE INVENTION

It is an object of at least one embodiment of the present invention to provide a method and a structure for on-chip switching of a transmission and receiving path to and from an antenna.

It is another object of the present invention to provide this capability for frequencies in the Gigahertz range.

It is yet another object of the present invention to provide this capability for frequencies in the Megahertz range.

It is still another object of the present invention to match impedances between the on-chip switching means and the antenna.

These and many other objects have been achieved in a first embodiment by arranging for the transmission mode a path from the on-chip power amplifier to the off-chip antenna comprising a first on-chip switch, all in series with an off-chip impedance matching circuit and a half wavelength line. Further, there is when in receiving mode a path from the off-chip antenna to the on-chip low noise amplifier (LNA) comprising, off-chip, a quarter wavelength line and impedance matching circuit. Between the input to the LNA and a reference potential is an on-chip second switch. In transmission mode both switches are closed, while in receiving mode both switches are open. The open position of the switches allows for optimal transmission of the signal in either direction. For transmission and receiving of Megahertz frequencies the half and quarter wavelength lines can be replaced by LC networks. In a second preferred embodiment one can reverse the switching topology: when in RX Mode, the TX output will be shorted to ground and when in TX Mode, the RX input will be an open circuit at the input. In this second preferred embodiment, the TX output will be connected to the Antenna Port through a quarter wavelength (¼ WL) line and the RX input through a half wavelength (½ WL) line.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 1 is a block diagrams of a first version of the related art.

FIG. 2 is block diagrams of a second version of the related art.

Use of the same reference number in different figures indicates similar or like elements.

DESCRIPTION OF THE PREFERRED EMBODIMENT

Figure 3A:
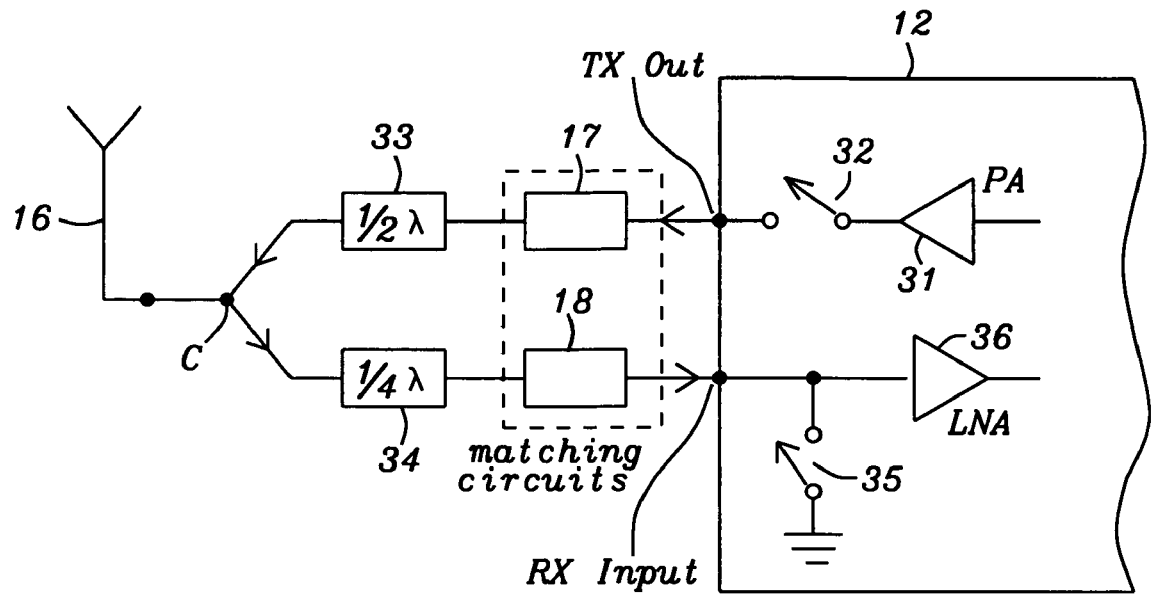
FIGS. 3a and 3b are block diagrams of preferred embodiments of the present invention for antenna switching schemes in the 2.4 GHz range.

We now describe a first preferred embodiment of the present invention by reference to FIG. 3a. Illustrated is a switching scheme where antenna 16 receives a signal from terminal TX Out and sends a signal to terminal RX Input. When in transmitting mode, on-chip power amplifier (PA) 31 is coupled via closed switching means 32 to terminal TX Out on chip 12. TX Out then couples via matching circuit 17 to a zero length or half wavelength (½ WL, ½ λ) line 33. Wavelength line 33 is then coupled via terminal C to antenna 16. When in receiving mode, antenna 16 is coupled via terminal C to quarter wavelength (¼ WL, ¼ λ) line 34 and matching circuit 18 to terminal RX Input on chip 12. RX Input then couples to on-chip low noise amplifier (LNA) 36. The line connecting RX Input and LNA 36 is also coupled via switching means 35 to a reference potential (typically ground). When in transmitting mode and when PA 31 is active, switching means 32 is closed, as already mentioned, and so is switching means 35. This allows the antenna to receive maximum power because there are no reflections from the end of the transmission line at RX Input because of the short to ground. If the PCB layout allows, it is better to use a shorter line—that is zero length. For example if the matching circuit 17 can be stretched between TX Out and the antenna port (terminal C) then no additional transmission line is needed. If the distance is longer, a half wavelength line or a multiple of the half wavelength line will need to be used.

Still referring to FIG. 3a, when in receive mode, both switching means 32 and 35 are open. Switching means 32 is open to prevent power from the antenna to be directed towards PA 31. Since the impedances of TX Out and RX Input are not equal to 50 Ohms, matching circuits 17 and 18 provide impedance matching to the 50 Ohms antenna impedance. The proposed invention will be able to transmit and receive typically in the 2.4 GHz range but may range from 1 GHz to 10 GHz. It is understood that switching means 32 and 35 may be incorporated into PA 31 and LNA 36, respectively.

Switching means may imply devices such as a transistor or a transistor circuit, either of these in discrete form or in integrated circuits (IC), a relay, a mechanical switch. These devices are cited by way of illustration and not of limitation, as applied to switching means. Amplifier means implies a device which amplifies a signal, and may be a transistor or a transistor circuit, either of these in discrete form or in integrated circuits (IC), a relay. These devices are cited by way of illustration and not of limitation, as applied to amplifier means. Impedance matching means implies a device for matching the impedance of one device or circuit to another device such as an inductor, a capacitor, and combinations thereof, or a transistor or a transistor circuit, either of these in discrete form or in integrated circuits (IC). These devices are cited by way of illustration and not of limitation, as applied to impedance matching means. Receiver means may imply devices such as the input of an amplifier able to receive a signal, a transistor or a transistor circuit, either of these in discrete form or in integrated circuits (IC). These devices are cited by way of illustration and not of limitation, as applied to receiver means.

When transmitting (TX Mode), the idealized short of switching means 35 at the RX Input will be seen as a disconnection at the antenna 16 and the RX Input will not load the TX Out signal. When receiving (RX Mode), the idealized disconnection of the PA will be seen as a disconnection of TX Out at the antenna 16 and a signal from the antenna will be transferred through the (RX) ¼ WL line 34 to the RX Input. In practice, TX switching means 32 and RX switching means 35 are not ideal switches and have parasitic resistance and reactance. Circuits inside the IC must be designed in such a way that there will be a big impedance difference between TX Out and RX Input for the ON/OFF positions of switching means 32, 35. In addition, chip bonding and package parasitics will change impedances seen at the pins of the IC. Therefore TX matching circuits 17 and RX matching circuits 18 are necessary to compensate for those imperfections. At higher frequencies (the GHz range) matching circuits can be implemented using transmission lines (microstrip lines printed on PCB).

Figure 4A:
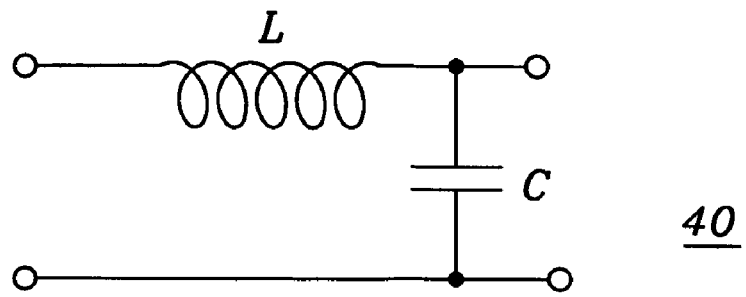
FIGS. 4a-c are circuit diagrams for ¼ and ½ wavelength lines of FIGS. 3a and 3b and for discrete implementations in the 400 MHz range.
Figure 4B:
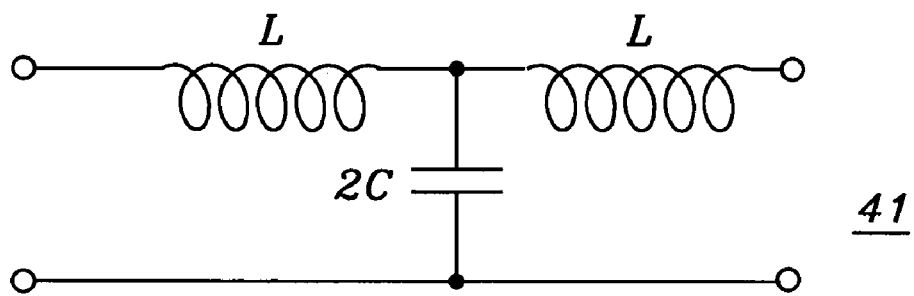
Figure 4C:
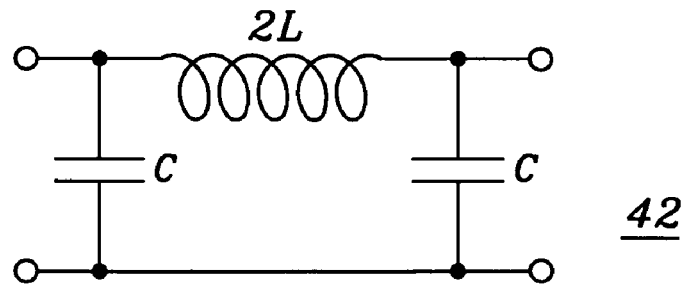

Transmission line circuits for wavelength lines 33, 34 are illustrated in FIGS. 4a-c and discussed below. Half wavelength lines (½ WL) and their multiples do not transform impedance. At the input of the line the same impedance is seen as that which is connected to the output.

An Open Circuit at the output will be seen at the input also as an Open Circuit.

Quarter wavelength lines (¼ WL) with the length equal to an odd number of ¼ WL (for example ¾ WL, ⁵⁄₄ WL) work as impedance transformers. The impedance at the input of the line is equal to the square of the characteristic impedance of the line divided by loading impedance at the output of the line. If the matching circuit 18 exceeds the distance of a quarter wavelength line, then a ¾ WL or ⁵⁄₄ WL or higher multiple will need to be used.

A Short Circuit at the output will be seen at the input as an Open Circuit.

Figure 3B:
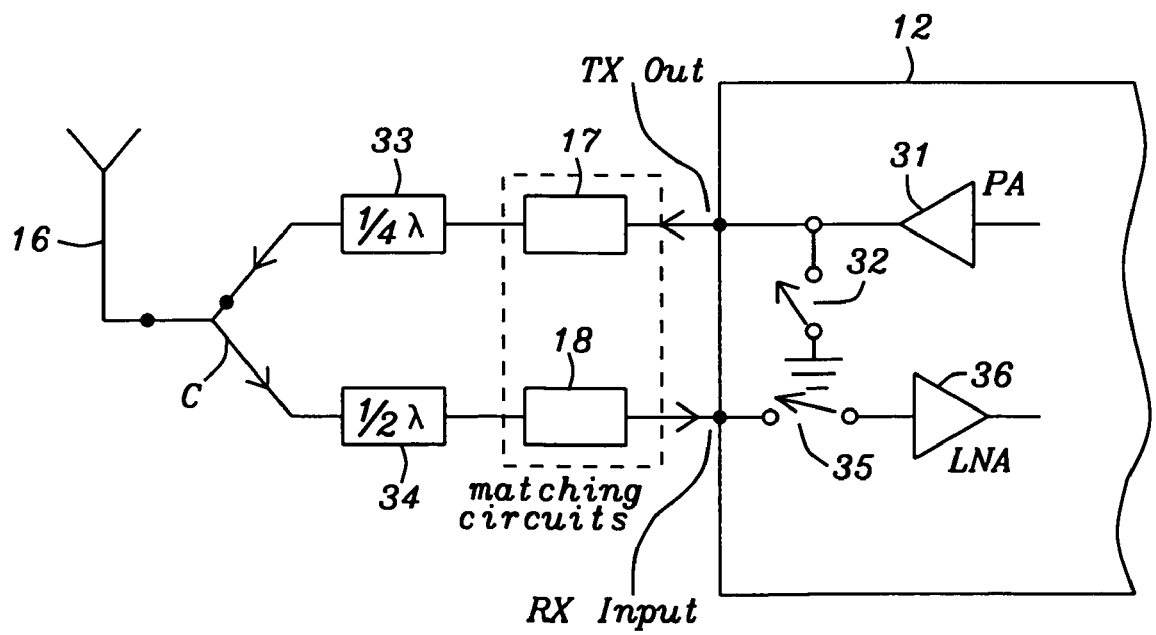

It is understood by those skilled in the art that other arrangements of the proposed antenna switching scheme are possible without differing from the scope of the invention. Described next and illustrated in FIG. 3b is a second preferred embodiment of the present invention, by way of illustration and not of limitation, as applied to antenna switching schemes. One can reverse the switching topology in the following manner. PA 31, in FIG. 3b, is coupled directly to the TX Out terminal and switching means 32—coupled between the output of PA 3i and a reference potential (typically ground)—will be shorted when in RX Mode. At the same time switching means 35, in series between the RX Input terminal and LNA 35, will be closed. Similarly, when in TX Mode the RX Input will be an open circuit at the input, i.e., switching means 35 is open, and switching means 32 will be open too, i.e., PA 31 will no longer be shortened to ground. In this embodiment, the TX Out terminal will be connected to the antenna port C through ¼ WL line 33 and the RX Input terminal through ½ WL line 34. In some radio frequency integrated circuit (RFIC) designs this topology may be even easier to implement. One can use an existing PA output device (transistor) as a switching means shorting the output of the PA to the reference potential.

Shown in FIG. 4a is the preferred circuit diagram of the quarter wavelength line (¼ WL) 34 and the discrete implementation for lower frequencies of typically 400 MHz, but ranging from 1 MHz to 1000 MHz. LC network 40 comprises inductor L in series and capacitor C in parallel and connected to a reference potential (typically ground).

Shown in FIG. 4b is a first preferred version of the circuit diagram of the half wavelength line (½ WL) 33 and the discrete implementation for lower frequencies of typically 400 MHz, but ranging from 1 MHz to 1000 MHz. In LC network 41 two ¼ WL lines are connected back-to-back and therefore it does not transform the impedance. LC network 41 comprises two inductors L in series and capacitor 2C in coupled between the two inductors and a reference potential.

Shown in FIG. 4c is a second preferred version of the half wavelength line (½ WL) 33, serving the same function as network 41 of FIG. 4b. LC network 42 comprises inductor 2L and two capacitors C coupled between either end of inductor 2L and a reference potential. Elements previously discussed are indicated by like numerals and need not be described further.

While the invention has been particularly shown and described with reference to the preferred embodiments thereof, it will be understood by those skilled in the art that various changes in form and details may be made without departing from the spirit and scope of the invention.

What is claimed is:

1. An on-chip antenna switching structure, comprising:
   a transmission path further comprising on a chip: an amplifier means and a first switching means and an output terminal in series, for providing an outgoing signal to an antenna when in a transmission mode;
   said antenna in communication with said output terminal via a first impedance matching means; said first impedance matching means matching an impedance of said antenna to an impedance of said chip;
   a receiving path further comprising on said chip: an input terminal coupled to a receiver means for receiving an incoming signal from said antenna when in a receiving mode;
   a second switching means on said chip coupled between an input to said receiver means and a reference potential, said second switching means, when closed, causing a transmission line between said input terminal and said receiver to be shorted to said reference potential, where when in said transmission mode, said first switching means and said second switching means are in a closed position and when in said receiving mode, said first switching means and said second switching means are in an open position; and
   said antenna in communication with said input terminal via a second impedance matching means, said second impedance matching means matching said impedance of said antenna to said impedance of said chip.

2. The on-chip antenna switching structure of claim 1, wherein said half wavelength line comprises an inductive-capacitive network.

3. The on-chip antenna switching structure of claim 1, wherein said second impedance matching means further comprises a quarter wavelength line, said quarter wavelength line transforming a short circuit at said input terminal to an open circuit at said antenna.

4. The on-chip antenna switching structure of claim 3, wherein said quarter wavelength line comprises an inductive-capacitive network.

5. An on-chip antenna switching structure, comprising:
   a transmission path further comprising on a chip: an amplifier means and an output terminal in series, for providing an outgoing signal to an antenna when in a transmission mode;
   a first switching means on said chip coupled between an output of said amplifier means and a reference potential, said first switching means, when closed, causing said output of said amplifier means to be shorted to said reference potential;
   said antenna in communication with said output terminal via a first impedance matching means; said first impedance matching means matching an impedance of said antenna to an impedance of said chip;
   a receiving path further comprising on said chip: an input terminal coupled to a receiver means for receiving an incoming signal from said antenna when in a receiving mode;
   a second switching means on said chip coupled in series between said receiver means and said input terminal; and
   said antenna in communication with said input terminal via a second impedance matching means, said second impedance matching means matching said impedance of said antenna to said impedance of said chip.

6. The on-chip antenna switching structure of claim 5, wherein, when in said transmission mode, said first switching means and said second switching means are in an open position.

7. The on-chip antenna switching structure of claim 5, wherein, when in said receiving mode, said first switching means and said second switching means are in a closed position.

8. The on-chip antenna switching structure of claim 5, wherein said first impedance matching means further comprises a quarter wavelength line, said quarter wavelength line transforming a short circuit at said output terminal to an open circuit at said antenna.

9. The on-chip antenna switching structure of claim 8, wherein said quarter wavelength line comprises an inductive-capacitive network.

10. The on-chip antenna switching structure of claim 5, wherein said second impedance matching means further comprises a half wavelength line, said half wavelength line transforming an open circuit at said input terminal to an open circuit at said antenna.

11. The on-chip antenna switching structure of claim 10, wherein said half wavelength line comprises an inductive-capacitive network.

12. The on-chip antenna switching structure of claim 5, wherein an output device of said amplifier means is used as said first switching means to shorten said output of said amplifier means to said reference potential when in said receiving mode.

* * * * *